United States Patent
Noguchi

(10) Patent No.: US 10,337,606 B2
(45) Date of Patent: Jul. 2, 2019

(54) SHIFT CONTROL DEVICE FOR AUTOMATIC TRANSMISSION

(71) Applicant: HONDA MOTOR CO., LTD., Tokyo (JP)

(72) Inventor: Tomoyuki Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 15/127,269

(22) PCT Filed: Feb. 26, 2015

(86) PCT No.: PCT/JP2015/055674
§ 371 (c)(1),
(2) Date: Sep. 19, 2016

(87) PCT Pub. No.: WO2015/146464
PCT Pub. Date: Oct. 1, 2015

(65) Prior Publication Data
US 2018/0100579 A1    Apr. 12, 2018

(30) Foreign Application Priority Data
Mar. 27, 2014   (JP) .................................. 2014-067010

(51) Int. Cl.
*B60W 30/16*        (2012.01)
*F16H 61/02*        (2006.01)
(Continued)

(52) U.S. Cl.
CPC ... *F16H 61/0213* (2013.01); *B60W 2550/308* (2013.01); *F16H 59/18* (2013.01);
(Continued)

(58) Field of Classification Search
CPC .......................... B60W 30/16; B60W 30/162
See application file for complete search history.

(56) References Cited

U.S. PATENT DOCUMENTS 5,774,069 A  *  6/1998  Tanaka ...................... B60T 7/12
                                                                180/167
6,405,132 B1 *  6/2002  Breed .................... B60N 2/002
                                                                701/117
(Continued)

FOREIGN PATENT DOCUMENTS

CN         1624360 A      6/2005
JP       10-306872 A     11/1998
(Continued)

OTHER PUBLICATIONS

Canadian Office Action Application No. 2,941,092 dated Jul. 25, 2017.
(Continued)

*Primary Examiner* — Tisha D Lewis
(74) *Attorney, Agent, or Firm* — Squire Patton Boggs (US) LLP

(57) ABSTRACT

A shift control device for an automatic transmission is provided with an automatic shift mode and a manual shift mode instructed by a manual operation of a driver. The shift control device includes at least one processor and at least one memory including computer program code that cause the shift control device to measure a following distance between an own vehicle and a front vehicle, measure an accelerator opening of an engine, judge whether the measured following distance is equal to or less than a predetermined set value if a downshift is instructed by a manual operation of the driver and the measured accelerator opening is fully closed, and determine a target shift stage based on the following distance if the following distance is equal to or less than the set value. Accordingly, the shift control device downshifts to the target shift stage.

4 Claims, 4 Drawing Sheets

(51) Int. Cl.
*F16H 59/18* (2006.01)
*F16H 59/44* (2006.01)
*F16H 59/60* (2006.01)
*F16H 59/68* (2006.01)

(52) U.S. Cl.
CPC .............. *F16H 59/44* (2013.01); *F16H 59/60* (2013.01); *F16H 2059/6815* (2013.01); *F16H 2061/022* (2013.01)

(56) References Cited

U.S. PATENT DOCUMENTS

| | | | | |
|---|---|---|---|---|
| 7,400,964 | B2* | 7/2008 | Shiiba | B60K 31/0008 303/152 |
| 2003/0033073 | A1* | 2/2003 | Kichima | B60K 31/0008 701/96 |
| 2005/0125137 | A1 | 6/2005 | Shiiba et al. | |
| 2009/0171540 | A1 | 7/2009 | Sugiura et al. | |
| 2009/0171541 | A1 | 7/2009 | Sugiura et al. | |
| 2013/0110360 | A1* | 5/2013 | Saito | F16H 61/0213 701/51 |

FOREIGN PATENT DOCUMENTS

| | | |
|---|---|---|
| JP | 2003-054395 A | 2/2003 |
| JP | 2005-147292 A | 6/2005 |
| JP | 2006-242266 A | 9/2006 |
| JP | 2007-062711 A | 3/2007 |
| JP | 2007-091207 A | 4/2007 |
| JP | 2007-132385 A | 5/2007 |
| JP | 2009-156433 A | 7/2009 |
| JP | 2009-156435 A | 7/2009 |

OTHER PUBLICATIONS

International Search Report dated Jun. 2, 2015 corresponding to International Patent Application No. PCT/JP2015/055674 and English translation thereof.
Chinese Notice of Reasons for Rejection application No. 201580015357 dated May 27, 2017.
Chinese Search Report application No. 201580015357 dated May 27, 2017.

* cited by examiner

SHIFT CONTROL DEVICE FOR AUTOMATIC TRANSMISSION

TECHNICAL FIELD

The present invention relates to a shift control device for an automatic transmission including an automatic shift mode and a manual shift mode.

BACKGROUND ART

A conventional shift control device for an automatic transmission for a vehicle includes an automatic shift mode for performing a shift operation by determining a shift stage or a gear ratio to be set on the basis of a running condition and a manual shift mode for performing a shift operation instructed by a manual operation of a driver. Such automatic transmission is configured, for example, to instruct an upshift or a downshift stage by stage by operating a gear shift lever in a manual range, or instruct an upshift or a downshift stage by stage every time a paddle, provided to a steering wheel, is pushed, thereby allowing to instruct a shift operation by a manual operation (see Patent Document 1 below for example).

As described above, in the manual shift mode of the conventional automatic transmission, the downshift operation can be performed by instructing a downshift by one shift stage per operation. Due to this, when a multistage downshift is desired, the downshift operation needs to be performed multiple times, taking much time for performing the multistage downshift. Since a downshift by the manual operation requires approximately 500 milliseconds to one second per operation, it takes approximately at least two seconds if a downshift, for example, by four shift stages is desired.

Automatic transmissions in recent years are significantly multistaged with small gear ratios, an engine braking may be insufficiently effective by downshifting only by one stage per operation. Due to this, at the time of applying an engine brake by a manually-operated downshift operation, multiple downshifts are required before resulting in an intended amount of engine brake and accordingly likely to need much time. Therefore, for example, when a user is about to apply an engine brake in response to a following distance closer to a front vehicle, the driver might carelessly approach the front vehicle, failing to keep a proper following distance. Thus, the manually-operated engine brake has been less user-friendly.

As a prior art for keeping the following distance to the front vehicle, for example, Patent Document 2 discloses vehicle speed control using a radar installation for acquiring information such as a relative position and a relative distance to the front vehicle so that based on such information, the driver can follow the front vehicle, keeping the following distance constant.

In addition, Patent Document 3, for example, discloses collision reducing brake control for evading or reducing collision by automatically apply a brake when an external sensor such as a camera or a radar installation detects an object in front of a vehicle.

RELATED ART DOCUMENTS

Patent Documents

[Patent Document 1] Japanese Patent Laid-Open No. 2007-132385

[Patent Document 2] Japanese Patent Laid-Open No. 2007-62711

[Patent document 3] Japanese Patent Laid-Open No. 2007-91207

Disclosure of the Invention

The present invention was made in view of an above-mentioned point, and the purpose is to provide a shift control device for an automatic transmission including an automatic shift mode and a manual shift mode that can perform a multistage downshift only by giving a one-time downshift instruction by a manual operation.

A shift control device (10) for an automatic transmission (100) in accordance with the present invention includes an automatic shift mode and a manual shift mode. The automatic shift mode performs a shift operation by determining a shift stage or a gear ratio to be set based on a running condition. The manual shift mode performs a shift operation instructed by a manual operation (12, 14, 16, 18) of a driver. The shift control device (10) includes a following distance measuring means (30), an accelerator opening measuring means (32), a following distance judging means (34, S2) and a target gear stage determining means (38, S3). The following distance measuring means (30) measures a following distance between an own vehicle and a front vehicle. The accelerator opening measuring means (32) measures an accelerator opening of an engine. The following distance judging means (34, S2) judges whether the measured following distance is smaller than a predetermined set value if a downshift is instructed by a manual operation of a driver, and the measured accelerator opening is fully closed (S1). The target shift stage determining means (38, S3) determines a target shift stage based on the following distance if the following distance is equal to or smaller than the set value. Accordingly, the shift control device (10) performs a downshift to the determined target shift stage (S4).

The shift control device (10) is configured to determine the target shift stage based on the following distance to the front vehicle if the following distance is smaller than the predetermined set value when a downshift is instructed by the manual operation of the driver in the state that the accelerator opening is fully closed. This allows a multistage downshift, for example, by two stages according to a determined target shift stage only by giving a one-time downshift instruction by the manual operation. Also, since the target shift stage is determined based on the following distance, the most appropriate target shift stage can be determined according to the following distance to the front vehicle. Thus, an intended amount of engine brake can be automatically achieved only by giving a one-time downshift instruction by the manual operation.

In one embodiment, the target shift stage determining means further includes a deceleration calculating means (36) for on the basis of each vehicle speed of the own vehicle and the front vehicle, the following distance and a predetermined target following distance, calculating a deceleration required to achieve the predetermined target distance between the vehicles after performing the downshift, thereby determining the target shift stage based on the calculated deceleration. This allows to determine the target shift stage so that the following distance after performing the downshift becomes the predetermined target following distance. Therefore, an engine brake can be applied so as to widen the following distance to the target following distance only by giving a one-time downshift instruction by the manual operation. This improves the operability of an engine brake by a manual operation in the automatic transmission.

Moreover, in the following distance judging means of the one embodiment, the predetermined set value is the predetermined target following distance that the driver desires to achieve after performing the downshift. This allows to determine the target shift stage and perform the downshift to the target shift stage if the following distance to the front vehicle is equal to or less than the target distance. Thus, an appropriate amount of engine brake can be applied and an appropriate following distance can be kept only by giving a one-time downshift instruction by the manual operation.

It should be noted that the bracketed reference numerals in the above description are examples of the elements of the embodiment described later.

According to the present invention, in the shift control device for the automatic transmission including the automatic shift mode and the manual transmission mode, a multistage downshift, for example, by two stages can be performed depending on the determined target shift stage only by giving a one-time downshift instruction by the manual operation. Accordingly, the present invention has a superior effect to achieve the intended amount of engine brake without spending much time.

MODE FOR CARRYING OUT THE INVENTION

An embodiment of the present invention will now be described in detail with reference to the accompanying drawings.

Figure 1:
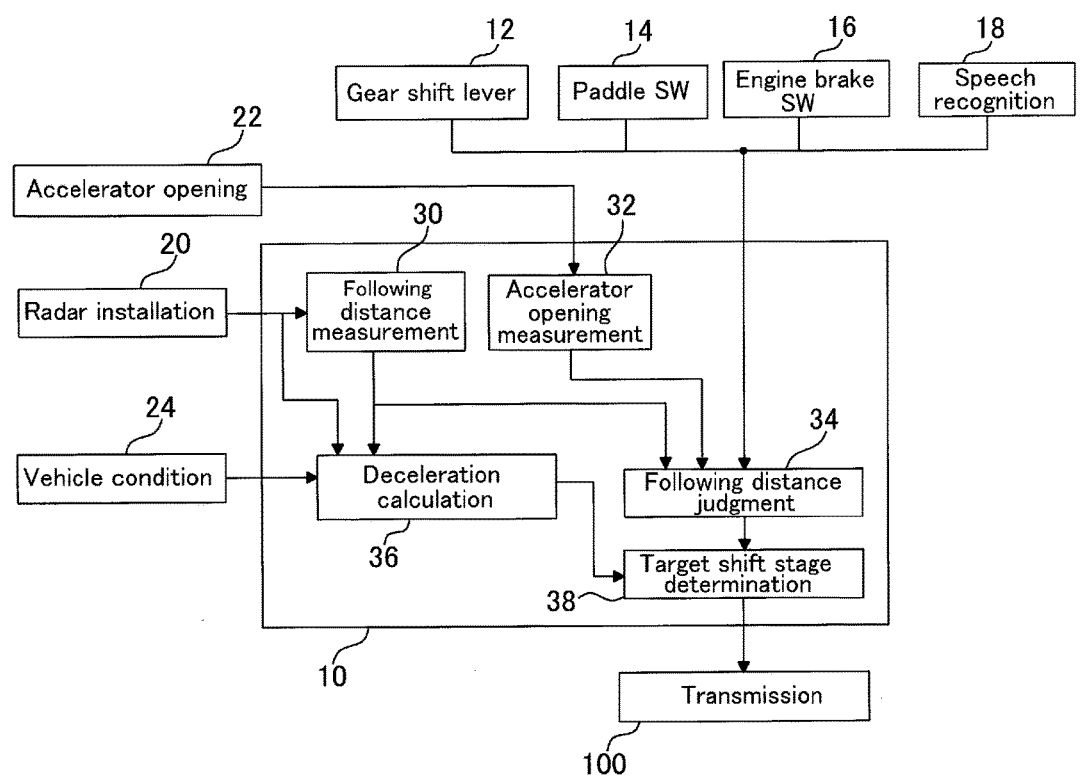
FIG. 1 is a functional block diagram of a configuration of a shift control device for an automatic transmission of one embodiment of the present invention.

FIG. 1 is a functional block diagram of a configuration of a shift control device for an automatic transmission of one embodiment of the present invention. Mounted on an automobile (vehicle) and including a torque converter and a multistage transmission gear mechanism, the automatic transmission 100 transmits an output from an engine to a driving shaft, which is not shown in the figure. The automatic transmission 100 is configured to perform a shift operation by controlling the shift control device 10 and select one of plural shift stages by this shift operation.

The shift control device 10 includes a CPU, a memory, an A/D converter, a D/A converter and a microcomputer for taking in various information including detected signals from various kinds of sensors and input signals based on various kinds of user operations. The CPU executes a software program stored in the memory, thereby controlling a shift operation of the automatic transmission device 100. The shift control device 10 includes an automatic shift mode for performing a shift operation by determining a shift stage or a gear ratio to be set based on a running condition and a manual transmission mode for performing a shift operation instructed by a manual operation of a driver.

As a means for instructing the shift operation by the manual operation of the driver (user), the shift control device 10 includes a gear shift lever 12, a paddle switch ("Paddle SW" in the figure) 14, an engine brake switch ("Engine brake SW" in the figure) 16 and a speech recognition means ("Speech recognition" in the figure) 18. An instruction signal input using the gear shift lever 12, the paddle switch 14, the engine brake switch 16 or the speech recognition means 18 is output to the shift control device 10. The gear shift lever 12 includes, for example, shift positions such as a parking range, a reverse travel range, a neutral range, a drive range and a sport range (or a manual shift range). When the gear shift lever 12 is in the drive range, the automatic shift mode is selected, and when the gear shift lever 12 is in the sport range, the manual transmission mode is selected.

In the manual transmission mode, the user can input an upshift instruction or a downshift instruction into the shift control device 10 by the manual operation using the gear shift lever 12, the paddle switch 14, the engine brake switch 16 or the speech recognition means 18. When the gear shift lever 12 is in the sport range, an upshift instruction or a downshift instruction can be input by the manual operation. The paddle switch 14 is composed of an upshift switch and a downshift switch provided to a steering wheel. An upshift instruction is input by the manual operation of the upshift switch, and a downshift instruction is input by the manual operation of the downshift switch. The engine brake switch 16 is a switch for instructing application of an engine brake and inputs a downshift instruction into the shift control device 10 by the manual operation. The speech recognition means 18 is a means for inputting various instructions including an upshift instruction and a downshift instruction into the shift control device 10 using a voice uttered by the driver. The speech recognition means 18 is configured to include a mike for acquiring the voice and a speech recognition module for recognizing the acquired voice and supplying an instruction signal depending on the voice to the shift control device 10. The speech recognition module is composed of a computer including a CPU and a memory and a software program for making the computer execute a speech recognition function.

A radar installation 20, an accelerator opening sensor 22 and a vehicle condition detecting sensor 24 are connected to the shift control device 10.

The radar installation 20 is an example of a means for acquiring information related to a running condition of a front vehicle such as a vehicle speed and a following distance thereof. The radar installation 20 transmits electromagnetic waves such as laser beams and millimeter waves in an appropriate detection direction (for example, to the front of an own vehicle). When these transmitted electromagnetic waves are reflected by the vehicle running in front of the own vehicle, the radar installation 20 receives the reflected waves and outputs a detected signal depending on the reflected waves to the shift control device 10. Based on the detected signal from the radar installation 20, the shift control device 10 can acquire information related to the running condition of the front vehicle such as the following distance between the own vehicle and the front vehicle.

The accelerator opening sensor 22 detects an accelerator opening of the engine depending on a accelerator pedal operation by the driver, and outputs a detected signal to the shift control device 10.

The vehicle condition detecting sensor 24, intended to detect information related to the running condition of the own vehicle, is composed, for example, of a vehicle speed sensor for detecting a vehicle speed of the own vehicle and then outputting the detected vehicle speed to the shift control device 10. The vehicle condition detecting sensor 24 may include a yaw rate sensor, a steering angle sensor, an automobile navigation system using a GPS measurement signal and the like, besides the vehicle speed sensor.

As a functional module realized by a software processing, the shift control device 10 includes a following distance measuring means 30, an accelerator opening measuring means 32, a following distance judging means 34, a deceleration calculating means 36 and a target shift stage determining means 38. The following distance measuring means 30 measures a following distance between the own vehicle and the front vehicle based on a detected signal from the radar installation 20. The accelerator opening measuring means 32 measures an accelerator opening of the engine based on a detected signal input from an accelerator opening sensor 22. When a downshift is instructed by a manual operation using the gear shift lever 12, the paddle switch 14, the engine brake switch 16 or the speech recognition means 18, and the accelerator opening of the engine is fully closed, the following distance judging means 34 judges whether the following distance measured by the following distance measuring means 30 is smaller than a predetermined set value. The deceleration calculating means 36 calculates a deceleration required to achieve a predetermined target distance after performing a downshift, based on running conditions of the own and front vehicles including the following distance. The target shift stage determining means 38 determines a target shift stage as a target for a downshift control depending on the calculated deceleration. Subsequently, the shift control device 10 controls a shift operation of the automatic transmission 100 so as to downshift to the determined target shift stage.

Next, with reference to the flow chart of FIG. 2, an example of a downshift operation procedure depending on a downshift instruction by a manual operation will be described. When a user inputs a downshift instruction by a manual operation using the gear shift lever 12, the paddle switch 14, the engine brake switch 16 or the speech recognition means 18, the CPU of the shift control device 10 activates a processing shown in FIG. 2 depending on a one-time downshift instruction by the manual operation.

In Step S1, based on an instruction signal input from the gear shift lever 12, the paddle switch 14, the engine brake switch 16 or the speech recognition means 18, the CPU of the shift control device 10 judges whether the instruction is a downshift instruction and judges whether the accelerator opening ("AP" in the figure) of the engine measured by the accelerator opening measuring means 32 is fully closed. If an upshift is instructed by the manual operation, or the accelerator opening is not fully closed (NO to Step S1), the CPU of shift control device 10 ends this processing.

If the downshift is instructed by the manual operation, and the accelerator opening is fully closed (YES to Step S1), in Step 2, the CPU of the shift control unit judges whether a current following distance measured by the following distance measuring means 30 is smaller than a predetermined set value (operation of the following distance judging means 34). The predetermined set value can be set to a following distance which, for example, the user finds short and accordingly wants to decelerate to widen the following distance. This value can be set, for example, to the same as a target following distance, which will be described later.

If the current following distance is smaller than the predetermined set value (YES to Step S2), in other words, if the following distance is short, in Step S3, the CPU of the shift control device 10 determines a target shift stage based on the following distance (operation of the target shift stage determining means 38).

A processing example of Step S3 will be described in detail. The CPU of the shift control device 10 first calculates a deceleration required to achieve the predetermined target following distance (referred to as "required deceleration") using the deceleration calculating means 36 after performing the downshift. Then, comparing the calculated required deceleration with each deceleration expected to be achieved upon a shift to each of the shift stages (referred to as "expected deceleration"), the CPU selects, of the expected decelerations of the shift stages, a shift stage having an expected deceleration equal to or larger than and closest to the required deceleration as a target shift stage. As an example, for the selection of the target shift stage, a limit can be set to the number of stages for which a downshift is permitted, for example, by three shift stages at most depending on a one-time instruction.

The predetermined target following distance is set as a distance that the driver desires to achieve after performing the downshift. This can be set to the same value as the predetermined set value used for the judgment in Step S2. Namely, the predetermined set value can be set at to a following distance which, for example, the user finds short and accordingly wants to decelerate to widen the following distance.

An example of how to calculate a required deceleration will be described. The required deceleration is calculated based on a (current) vehicle speed at the time of a downshift instruction, a target speed that the driver desires to achieve after a downshift operation, a current following distance and a predetermined target following distance. The current vehicle speed can be acquired from the vehicle condition detecting sensor 24. The target speed is, for example, a vehicle speed of the front vehicle. The vehicle speed of the front vehicle can be acquired from the radar installation 20. It should be noted that the vehicle speed and the following distance of the front vehicle are conventionally acquired from the radar installation 20 in a following running control function targeted for the front vehicle and the like. In a calculation processing of the required deceleration also, data such as the front vehicle speed and the following distance used in the conventional function and the like are available.

Figure 3:
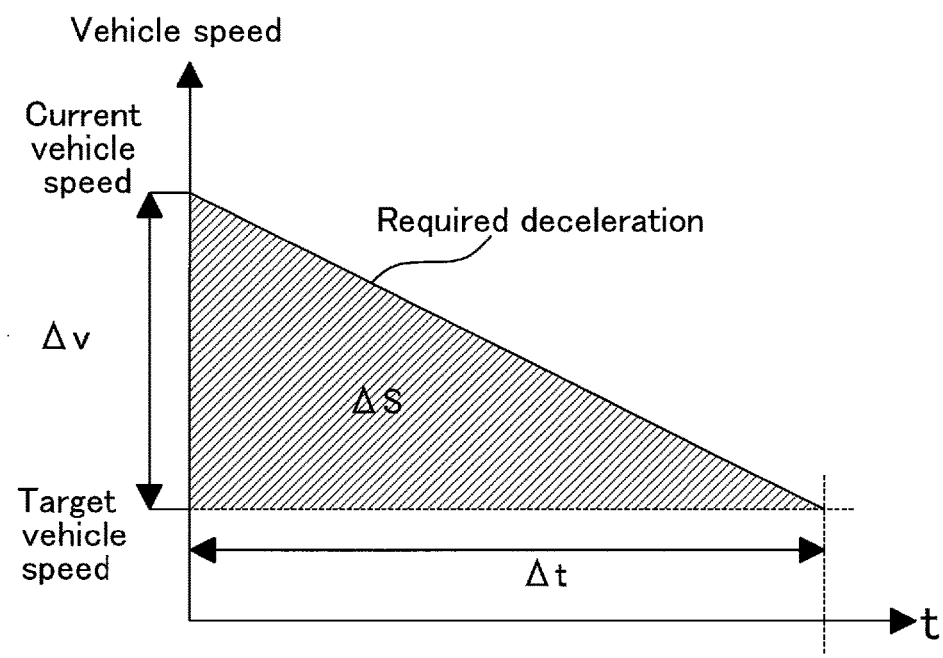
FIG. 3 is a view for illustrating how to calculate a required deceleration.

FIG. 3 is a graph illustrating how to calculate the required deceleration, in which the vertical axis shows vehicle speed and the horizontal axis shows time. Assume an amount of change required to widen a current following distance to a target following distance after performing a downshift (that is, difference between the current following distance and the target following distance) as $\Delta S$, and assume time for changing a current vehicle speed and the current following distance respectively into a target vehicle speed and the target following distance as $\Delta t$. The amount of change $\Delta S$ of the following distance can be calculated by subtracting the target following distance from the current following distance. Therefore, the time $\Delta t$ can be calculated based on the amount of change $\Delta S$ and a speed variation $\Delta v$ from the current vehicle speed to the target vehicle speed. In FIG. 3, the required deceleration is shown as a ratio (gradient) for decelerating from the current vehicle speed to the target vehicle speed after the current time $\Delta t$. Therefore, the required deceleration can be calculated from the speed variation $\Delta v$ and the time $\Delta t$ from the current vehicle speed to the target vehicle speed.

Furthermore, an expected deceleration of each shift stage can be calculated by the below-mentioned Formula (1), for example, based on a ratio of the shift stage, an engine friction torque, a tire radius and a running resistance. It should be noted that in Formula (1), the ratio is expressed as a ratio of a transmission input rotation number to a transmission output rotation number at the shift stage.

$$\text{Expected deceleration} = \{\text{Friction torque} * \text{Ratio} / (2 * \text{Tire radius}) + \text{Running resistance}\} / \text{Vehicle weight} \quad \text{Formula (1)}$$

Figure 4:
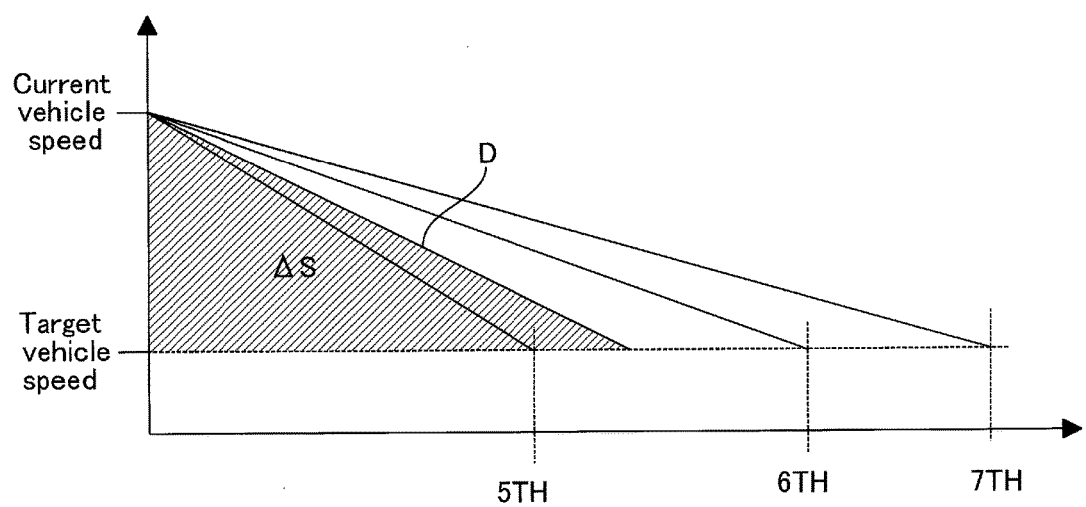
FIG. 4 is a view for a comparative illustration between a calculated required deceleration and an expected deceleration of each shift stage.

For example, in comparison of a deceleration of each of the fifth forward speed stage (5TH), the sixth forward speed stage (6TH) and the seventh forward speed stage (7TH) illustrated in FIG. 4 to a calculated required deceleration D if a downshift is performed during running at the eighth speed stage, the deceleration of the fifth speed stage approximates the required deceleration D in this case. Still, the deceleration of the fifth speed stage is below the required deceleration D, failing to meet the above-described condition. If the fifth forward speed stage is selected, it would lead to overdeceleration. Therefore, the sixth forward speed stage having a deceleration equal to or larger than and closest to the required deceleration D is selected as the target shift stage.

In Step S4, the CPU of the shift control device 10 controls a shift operation of the automatic transmission 100 so as to downshift to the target shift stage determined in Step S3. For example, in the situation exemplified in FIG. 4, the CPU of the shift control device 10 performs a downshift by two gear steps from the eighth forward speed step to the sixth forward speed step. Therefore, only a one-time downshift instruction by the manual operation allows to perform a multistage downshift depending on the determined target shift stage, for example, a downshift by two stages. The multistage downshift control may be performed so as to sequentially downshift stage by stage from the current shift stage to the target shift stage, such as from the current eighth forward speed stage to the seventh forward speed stage and then from the seventh forward speed stage to the target sixth forward speed stage, or to downshift directly from the current eighth forward speed stage to the target sixth forward speed stage. Moreover, since in Step S3, the required deceleration based on various running conditions of the vehicle including the following distance has been calculated, and the target shift stage has been determined according to the required deceleration, the most suitable target shift stage can be determined depending on the following distance to the front vehicle. Therefore, only a one-time downshift instruction by the manual operation allows to automatically acquire an intended amount of engine brake. In addition, since the required deceleration is calculated so as to achieve the target distance after performing the downshift, an engine brake can be applied for widening the following distance to the target following distance. This improves the operability of an engine brake by a manual operation in the automatic transmission.

Furthermore, after having determined the target shift stage based on the following distance in Step S3, the CPU of the shift control device 10 may display the determined shift stage as well as an alarm for notifying that a downshift to the target shift stage will be performed, on an appropriate indicator such as a meter. The alarm may be indicated, for example, by an interval of blinking at the time of flashing display of the shift stage or other appropriate indication functions.

On the other hand, if while the downshift instruction is given by the manual operation, and the accelerator opening is fully closed (YES to Step S1), the current following distance is larger than the predetermined set value (NO to Step S2), namely, if the following distance is large, the CPU of the shift control device 10 performs a normal downshift in Step S5. In other words, the CPU of the shift control device 10 controls a shift operation of the automatic transmission 100 so as to downshift only by one stage depending on a one-time downshift instruction by the manual operation.

An example of rules in the case that the downshift control depending on the user operation is performed together with another shift control function using the shift control device 10 will be described. A "D paddle function" is conventionally available for accepting an upshift instruction and a downshift instruction by the manual operation of a paddle switch 14 even when the automatic shift mode is selected. The D paddle function also allows to execute the processings of Steps S1 to S4 depending on the downshift instruction by the manual operation and thus perform the downshift control to the determined target shift stage. Similar to the conventional D paddle function, this state of the target shift stage being selected is canceled by a predetermined D paddle cancellation condition (judgment of cruising, etc.). After cancellation, the shift operation control using the normal automatic shift mode is resumed. Further, even if safety functions such as a collision reduction brake control and a VSA function are invalidated, the downshift control is performed depending on the manual operation shown in FIG. 2. When the safety functions such as the collision reduction brake control and the VSA function are validated, the downshift instruction due to these functions is prioritized over the downshift instruction depending on the manual operation. Moreover, if the downshift is performed depending on the downshift instruction by the manual operation during the execution of the automatic following running function, comparing the shift stage determined in Step 3 to a shift stage required by the automatic following running function, the CPU of the shift control device 10 selects the smaller one.

Moreover, the CPU of the shift control device 10 may be configured to perform the downshift to the target shift stage determined in Step S3 even if the front vehicle deviates from the lane and accordingly the following distance increases before performing the downshift in Step S4 after determining the target shift stage in Step S3.

If in addition to the downshift instruction by the manual operation, a braking operation by the driver and/or a brake cooperative control using the automatic following running function or the VSA function are performed, the CPU of the shift control device 10 may add a deceleration due to the braking operation and/or the brake cooperative control and accordingly determine the target shift stage in Step 3.

Figure 2:
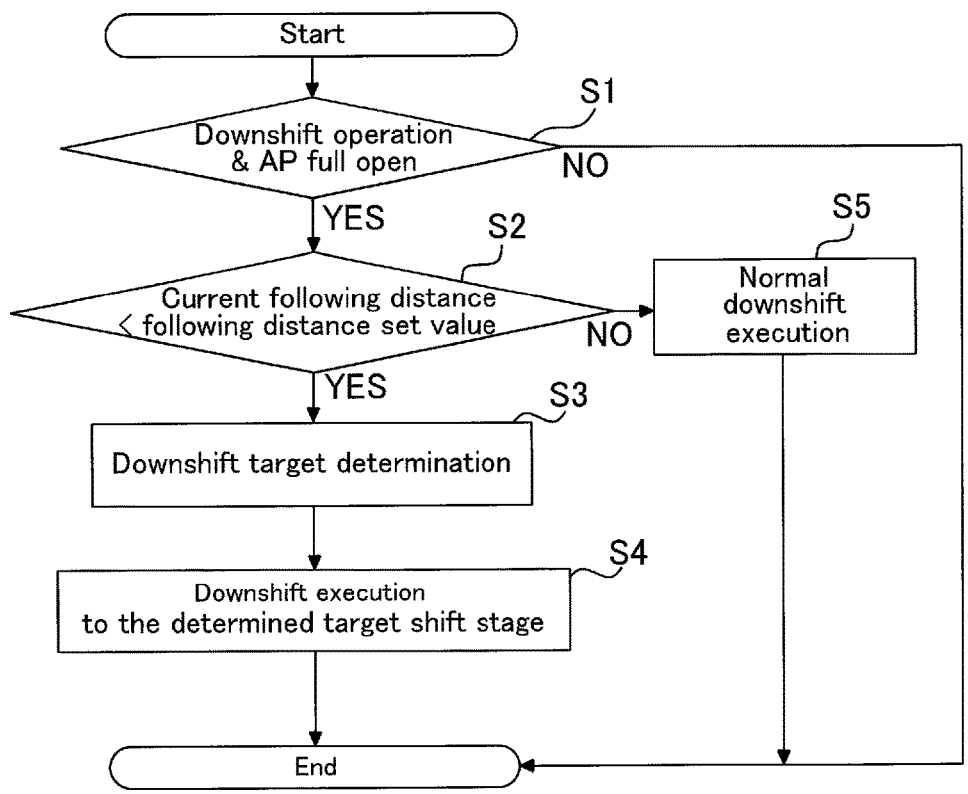
FIG. 2 is a flow chart illustrating an example of a procedure to perform a downshift by a manual operation.

In addition, if a malfunction of the sensor such as the radar installation 20 precludes measurement of the following distance to the front vehicle or the vehicle speed thereof, the CPU of the shift control device 10 shall not perform the downshift control shown in FIG. 2 even if the downshift instruction is given by the manual operation of the user.

While the embodiment of the invention has been described, it is to be understood that the invention is not limited to the foregoing embodiments. Rather, the invention can be modified to incorporate any number of variations or alterations within the scope of claims and the scope of technical concept described in the specification and the drawings thereof. For example, the methods for calculating a deceleration is not limited to the above-described one. Also, the rules for determining a target shift stage appropriately may be subject to change, addition and combination.

The means for instructing a downshift by the manual operation may be configured to include only either one of the gear shift lever 12, the paddle switch 14, the engine brake switch 16 or the speech recognition means 18. Also, the means is not restricted to the gear shift lever 12, the paddle switch 14, the engine brake switch 16 and the speech recognition means 18, but any instrument is applicable as far as it can input a downshift instruction by the manual operation. In addition, the automatic transmission 100 may have any configuration as far as it has multistage shift stages and includes the automatic shift mode and the manual shift mode.

The invention claimed is:

1. A shift control device for an automatic transmission, the shift control device comprising:
    an automatic shift mode for performing a shift operation by determining a shift stage or a gear ratio to be set based on a running condition;
    a manual shift mode for performing a shift operation instructed by a manual operation of a driver;
    at least one processor; and
    at least one memory including a computer program,
    wherein the at least one memory and the computer program are configured to, with the at least one processor, cause the shift control device at least to:
    measure a following distance between an own vehicle and a front vehicle;
    measure an accelerator opening of an engine;
    judge whether the measured following distance is equal to or less than a predetermined set value if a downshift is instructed by a manual operation of the driver and the measured accelerator opening is fully closed;
    determine a target shift stage based on the following distance if the following distance is equal to or less than the set value; and
    downshift to the determined target shift stage.

2. The shift control device for the automatic transmission according to claim 1, wherein the at least one memory and the computer program are further configured to, with the at least one processor, cause the shift control device at least to:
    calculate a deceleration required to achieve a predetermined target following distance after performing the downshift based on each vehicle speed of the own vehicle and the front vehicle, the following distance and the predetermined target following distance; and
    determine the target shift stage based on the calculated deceleration.

3. The shift control device for the automatic transmission according to claim 1, wherein the predetermined set value is a predetermined target following distance desired to be achieved after performing the downshift.

4. The shift control device for the automatic transmission according to claim 2, wherein the predetermined set value is a predetermined target following distance desired to be achieved after performing the downshift.

* * * * *